United States Patent Office 3,536,495
Patented Oct. 27, 1970

3,536,495
AMMONIA COMPLEXES OF HOP ALPHA ACIDS AND MODIFIED ALPHA ACIDS
Walter H. Fly, Milwaukee, and Donald H. Westermann, Brookfield, Wis., assignors to Miller Brewing Company, Milwaukee, Wis., a corporation of Wisconsin
No Drawing. Filed Mar. 13, 1968, Ser. No. 712,617
Int. Cl. C12c 9/02
U.S. Cl. 99—50.5      14 Claims

ABSTRACT OF THE DISCLOSURE

Granular, nonsticky, free-flowing ammonia-humulone complexes are prepared by treating humulone or its derivatives with ammonia in a solvent having a dielectric constant not greater than 2.1.

The use of hops in brewing is well documented in early Twelfth Century literature which indicates that hops were used in a Benedictine convent in Rupertsberg Bingen-on-Rhine. The contribution of hops to bitterness and promoting microbiological stability was well recognized. Although hops found increasing popularity during the ensuing 800 years, it was not until this immediate century that the compounds responsible for bitterness and bacteriostasis were identified. It is therefore no surprise that drastic changes in the use of hops in the brewing of beer are approached with great reservation and considerable caution. At the present time hops are the most expensive raw material used in the brewing process.

Brewers recognize that the utilization of the bitter components of hops in the brewing of beer is extremely poor. Sixty-five to eighty percent of the principal bitter component, humulone, will be lost during the addition of hops to the brew kettle, its ultimate isomerization, and the fermentation process. These losses have been studied extensively and the work by Meilgaard et al., Proc. Eur. Brew. Conv. (1955) pp. 109–118, is a typical example of characteristic process losses. Numerous attempts to minimize the loss of these exceedingly expensive compounds have been made, but with only limited success. Hops, as hereinafter defined, will be recognized to constitute the hop cone which is conventionally dried and used by the brewer predominantly through direct addition to the brew kettle.

One of the latest attempts to obtain betted control and greater utilization of hop components has been through the process of making hop extract. These extracts are generally extremely viscous liquids or tar-like masses with a high percentage of undefined components. The composite whole extracts have been added to the brew kettle where the bitter components are lost substantially in the same quantity as when using conventional dried hops. Addition of these extracts to the kettle provide the advantages of better control of the concentration of bitter components and the elimination of costly refrigerated storage of the whole dried hops. Preisomerization of the humulone to the more bitter component, isohumulone, has been accomplished in hop extracts. Addition of such preisomerized hop extracts post kettle has met with only limited success, largely because of the interference of undefined components which have a tendency to contribute to the production of haze and change in the product flavor. Hop extracts presently found in the marketplace allow a very limited control of the ratio of hop aroma to hop bitterness when the total extract is used in the brewing process. One object of this invention is to show how to successfully control the bitterness of a beer quite independently of its hop aroma characteristics.

Van Damme, Brewers Digest, 38, pp. 52–56 (1963), has indicated: "Perhaps the future will bring about improvements and simplification in hop practices in the sense that the bitter taste of beer will be controlled by the direct addition of an isohumulone solution." It is apparent that such an addition would involve the separation of the isohumulones, or so-called iso-alpha acids, from other extractable constituents of hops or the isomerization of these alpha acids outside of the brewing process. Such a purified isomerized alpha acid in a form which is readily handled, easily dispersed in the beer or wort, could then be added at any point in the brewing process to give the most beneficial properties with respect to beer bitterness, foam stability and bacteriostasis.

Brewing chemists have long recognized that the largest losses of isohumulone occur in the conventional boiling of wort in the brew kettle, followed by losses during the course of fermentation. The need for a product which could be added at any point in the brewing process to obtain desired properties is therefore readily apparent.

In the present state of the art, whole hop cones or ground hop cones are boiled in the wort for the desired length of time in order to dissolve hop resins away from the leaves and strigs. Continued boiling causes isomerization of humulones to isohumulones. While the hop oils are also dissolved, they are largely steam distilled from the wort during this boiling process. Since hops vary in resin content with age and maturity it is difficult for the brewer to have precise control over flavor and aroma of the finished product. Furthermore, it is expensive to provide refrigerated space for the storage of dried hops, and even under low temperature storage some degree of deterioration does occur.

Most of the extracts presently available, whether whole extracts or preisomerized extracts, are highly viscous materials. These are somewhat difficult to handle since they must be either preheated in order to remove them from the container or the entire container, with suitable openings provided, is suspended in the wort during kettle boil. In either case, the ability to handle the material leaves much to be desired.

In order to combat material handling problems and to prepare pure isohumulone, a soluble salt of alpha acids has been prepared (British Pat. Nos. 1,058,975 and 1,058,976). The resulting product from this process is the soluble salt, preferably the sodium salt, of humulones or isohumulones in a dry powder form. The process described in the preceding invention consists of a complex series of solvent extractions, followed by the exceedingly expensive step of freeze drying an aqueous alkali solution of those hop acids.

It is the further object of the invention described in this specification to show how solid, dry, free-flowing material, similar to that described in the preceding invention, can be prepared by a much simpler process without the complex steps of multiple extractions or freeze drying.

In addition to the solid sodium salt previously mentioned, a number of other solid forms of various hop compounds have been prepared. These include the well known 1,2-diaminobenzene complex of humulone and the lead salts, well known to those skilled in the art of hop chemistry. Certain solid crystalline forms of pure humulone and isohumulone have been prepared, with considerable difficulty. Lupulone is of course known to exist as a solid crystalline material and can be readily isolated from certain hop extracts, but is of little direct significance in brewing since it is predominantly lost or precipitated out in the brewing process.

It is an objective of this invention to show how a solid, granular, nonsticky, free-flowing precipitate of humulone or isohumulones can be readily prepared in a suitable solvent by the introduction of ammonia gas into a solution of the appropriate hop compound in that solvent.

It has been discovered that a granular-like solid complex of alpha acids and alpha isoacids can be precipitated from a suitable solvent by the introduction of ammonia gas into a solution of the alpha acid or isoalpha acid in that solvent. It has been discovered that high yields of this granular-like precipitate will occur only when the solvent possesses a dielectric constant of 2.1 or less. The dielectric constant of a material is described as follows: the force F exerted by one unit of electrical charge $Q_1$ on another $Q_2$ when separated by a vacuum is found to be proportional to the product of these charges divided by the square of the distance between them.

$$F = \frac{Q_1 Q_2}{D^2}$$

A proportionality constant K will equate the force to the charges and distance. Hence:

$$F = \frac{K Q_1 Q_2}{D^2}$$

The reciprocal of this proportionality constant or 1/K is known as the dielectric constant E. The dielectric constant of a vacuum is by definition 1.000000, and of course no solvent has a dielectric constant lower than 1.0. As a practical matter, dielectric constants of about 1.8 are a suitable lower limit. Lower values are operable (e.g., liquid methane), but such systems are difficult and expensive to use.

The introduction of ammonia gas into such solvents containing alpha acids and isoalpha acids will cause varying degrees of granulation of the precipitate to occur, dependent upon the dielectric constant of that solvent. As subsequent examples will show, it is a preferred embodiment of this invention to introduce ammonia gas into a solution of alpha acids or isoalpha acids and their modified derivatives in a solvent having a dielectric constant of 2.1 or less. Under these circumstances the ammonia complex precipitate is found to be more granular in nature and less resinous than when the dielectric constant of the solvent in question is in excess of 2.1. It has been noted that the form of precipitate obtained varies progressively from a sticky fluid mass at the higher dielectric constants (e.g. up to 3.4) to a solid granular non-sticky material when the solvent has a dielectric constant of 2.1 or lower.

It has further been discovered that the process of introducing ammonia gas into a whole hop extract solution will cause an unexpected and highly selective precipitation of the alpha acids thus providing a means of separating these alpha acids from beta acids contained in the hop extract solution. The subsequent precipitates obtained are found to exist in a molar ratio of one mole of ammonia to one mole of the hop compound. It has further been discovered that the precipitates thus obtained can be readily used in the brewing process, either at the kettle or post kettle, with considerable ease and very substantial utilization. It is thus possible to add isohumulones post kettle in the brewing process and obtain excellent yields of isohumulone, circumventing those large losses which are historically known to occur in the brew kettle or during fermentation.

That precipitate which is obtained from a suitable solvent extract of hops in which alpha acids, beta acids, hop waxes, hop oils, and other uncharacterized resins are dissolved, contains essentially no hop waxes, lupulones or oils. This provides obvious utility for post kettle addition of thee alpha acids after preisomerizing to isoalpha acids.

Ammonia-isohumulone complex is old. Hudson and Rudin, J. Inst. Brew., 65, 416–417 (1959) reported the preparation of a yellow, resinous, salt-like ammonia-isohumulone complex, by passing ammonia into a methanolic solution of isohumulone. The complex had a $NH_3$:isohumulone mole ratio of 1:1 and was reported to liquefy at 46° C. Aside from the low yield, it may also be reasonably presumed that the sticky form of the product reported by Hudson and Rudin precluded any further interest in the brewing industry. In this connection, it is noted that the use of a solvent of sufficiently low dielectric constant—which is the heart of the instant invention—will in fact give good yields, within short reaction periods, of a granular, nonsticky, free-flowing product readily collected, stored, weighed out, and easily dispersible in the beer, whether prior to the brew, or post-kettle. Even if the Hudson and Rudin product could be made in good yields, it would not have the physical advantages above noted, of the product of this invention.

In physical appearance there is a distribution of granule size, some granules being the original individual flocculent precipitates, and some resulting from agglomeration of these original flocculent particles. The granules are not crystalline as evidenced by lack of regular X-ray diffraction pattern, nor does differential thermal analysis show energy shifts indicating change in crystalline structure.

As is customary in the brewing art, the terms humulone, dihydrohumulone, tetrahydrohumulone (and their isoforms) and lupulone, when thus used in the singular, are understood to apply not to a single compound, but rather in each instance to a mixture of homologues, differing principally from each other in the alkyl group on the keto group attached to the number 2 ring carbon. Such homologous mixtures are found naturally occurring in the hop plant and carry over into any subsequent treatments, e.g., isomerization and reductions. (Humulone, for example, is a mixture of at least five such homologs, with homologous counterparts in isohumulone.)

In these examples the ammonia is preferably dry. Traces of water are not objectionable, but if the ammonia contains water in excess of solvent solubility, problems in recovery will result, since the water will be immiscible with the solvent, the water phase will be alkaline, and it will dissolve at least some of the humulone product, thereby reducing the yield of precipitated complex.

The following examples will serve to clarify the method of executing the process for making an ammonia complex of alpha or isoalpha acids and the high utilization of these complexes in the brewing process.

The results shown in Table I will illustrate the qualitative effect of the dielectric constant of a solvent on the formation of an ammonia complex of isohumulone in that solvent solution. 1% wt./vol. of dissolved isohumulone in the solvent was agitated and subjected to dry ammonia gas which was passed over the agitated surface. The variation in ammonia complex precipitate formed is qualitatively described in the following table.

TABLE I

| Solvent | Dielectric constant | Description |
| --- | --- | --- |
| n-Pentane | $E_{20°C.}=1.844$ | Immediate formation of a good flocculent, easily settling precipitate; good yield. |
| n-Hexane | $E_{20°C.}=1.890$ | Do. |
| 2,2,4-trimethyl pentane (isooctane). | $E_{20°C.}=1.940$ | Do. |
| Cyclohexane | $E_{20°C.}=2.023$ | Do. |
| 2-methyl-1,3-butadiene (isoprene). | $E_{20°C.}=2.10$ | Do. |
| 1,4-dioxane | $E_{25°C.}=2.209$ | A flocculent, easily settling precipitate formed, but yield was very low. |
| Carbon tetrachloride | $E_{20°C.}=2.238$ | Solution hazed, became slightly flocculent and rapidly became a resinous mass; very soft. |
| Benzene | $E_{20°C.}=2.284$ | Solution hazed, precipitate became slightly flocculent and rapidly became a resinous mass. |
| Toluene | $E_{20°C.}=2.379$ | Solution hazed and precipitate separated as a resinous, gummy mass. |
| Trichloroethylene | $E_{16°C.}=3.40$ | Slight haze formed, but no filterable precipitate formed in 3 minutes. Upon standing, a small amount of an oily material separated on sides of vessel. |
| Diethyl ether | $E_{20°C.}=4.335$ | Solution became slightly hazy after 3 minutes. A very small small amount of a thin oil formed on sides of vessel. |
| Chloroform | $E_{20°C.}=4.806$ | No visible change in solution. Solution was clear after 3 min. |
| Ethyl acetate | $E_{20°C.}=6.02$ | No visible precipitate formed. Solution remained clear after 3 min. |
| n-Hexyl alcohol | $E_{20°C.}=13.3$ | No precipitate formed after 3 min. Solution remained clear. |
| Ethanol | $E_{20°C.}=24.3$ | No precipitate formed after 3 min. Solution remained clear. |
| Methanol | $E_{25°C.}=32.6$ | No precipitate formed after 3 min. at room temperature. Solution remained clear. If methanol is chilled, negligible yield of flocculent yellow precipitate. |

The following examples will show the quantitative relationship between recovered precipitate of various alpha acids when this ammonia precipitate is formed in solvents of different dielectric constant.

EXAMPLE 1

100 mls. of a hexane extract of hops was placed in a 250 ml. flask. It was agitated by means of a magnetic stirrer, and dry ammonia gas was passed into the closed flask over the surface of the hexane until the precipitation ceased. The solid material was filtered off and the residual hexane removed by evaporation at room temperature under mild vacuum. The precipitate was a grey-green powder.

The hexane extract had the following composition:

| | Grams |
| --- | --- |
| Solids by weight | 1.89 |
| Humulone | 0.48 |
| Lupulone | 0.09 |

The filtrate removed from the precipitate had the following composition:

| | Grams |
| --- | --- |
| Solids by weight | 0.97 |
| Humulone | 0.00 |
| Lupulone | 0.09 |

The ammonia precipitate consisted of:

| | Grams |
| --- | --- |
| Weight of precipitate | 0.90 |
| Humulone | 0.46 |
| Lupulone | 0.00 |

The excellent preferential separation of the alpha from the beta hop acids is apparent in this example. Also, the amount of nonessential solids shows a marked reduction. The analysis for humulone and lupulone in this example was done by the A.S.B.C. assay procedure, as given in "Methods of Analysis of the American Society of Brewing Chemists," 6th Revised Ed., pp. 138A, 138B, and 138C (1958).

EXAMPLE 2

Humulone was separated from a hexane extract of hops by the method of Wollmer; Ber., 104 (1916). The humulone was isomerized of isohumulone by the method of Howard, Addendum: Preparation of Isohumulone, A, J. Inst. Brew., 65, p. 417 (1959), and was dissolved in sufficient hexane to give approximately 0.3% solution in a suitable container. The solution was agitated with a magnetic stirrer and dry ammonia gas was passed into the closed container until precipitation ceased. The precipitate was filtered off and the residual hexane removed by evaporation at room temperature under mild vacuum.

The theoretical values expected from the elemental analysis of an ammonia complex of isohumulone in a 1:1 molar ratio of ammonia to isohumulone are as follows:

Carbon—66.5%; hydrogen—8.7%; nitrogen—3.7%.

The analysis of a precipitate produced by this procedure was:

Carbon—65.9%; hydrogen—8.9%; nitrogen—3.9%.

The amount of ammonia required to produce a 1:1 molar ratio of $NH_3$ to isohumulone when measured at standard conditions for 0.4752 gram of isohumulone is: theoretical—29.8 mls. When measured at standard conditions the ammonia actually complexed in the preparation of this precipitate was: 29.1 mls.

EXAMPLE 3

Isohumulone was prepared by the method of Howard, supra from an extract of hops in which the humulone was isolated by the method of Wollmer, supra. The isohumulone was then reduced with sodium borohydride by the method of Koch (U.S. Pat. No. 3,044,879). Sodium borohydride reduced isohumulone has recently been given the name of rho-isohumulone by Verzele and will be hereinafter referred to as such.

The rho-isolumulone as described above was precipitated with gaseous ammonia by the method described in Example 2. The theoretical values expected from the elemental analysis of the ammonia complex of rho-isohuumulone in a 1:1 molar ratio of ammonia to rho-isohumulone are as follows:

Carbon—66.1%; hydrogen—9.2%; nitrogen—3.7%.

The analysis of a precipitate produced by this procedure was:

Carbon—65.9.%; hydrogen—9.4%; nitrogen—3.2%.

The amount of ammonia required to produce a 1:1 molar ratio of ammonia to rho-isohumulone when measured at standard conditions for 0.4163 gram of rho-isohumulone is: theoretical—25.9 mls. When measured at standard conditions the ammonia actually complexed in the preparation of this precipitate was 27.0 mls.

EXAMPLE 4

Isohumulone was prepared by the methods of Wollmer and Howard. The isohumulone so prepared was hydrogenated to dihydroisohumulone by the method of Brown et al., J. Chem. Soc. London, p. 548 (1959).

The dihydroisohumulone was precipitated from a hexane solution with ammonia gas as described in Example 1. The theoretical values expected from the elemental analysis of the ammonia complex of dihydroisohumulone in a 1:1 molar ratio of ammonia to dihydroisohumulone are as follows:

Carbon—66.1%; hydrogen—9.2%; nitrogen—3.7%.

The analysis of a precipitate produced by this procedure was:

Carbon—65.0%; hydrogen—9.4%; nitrogen—3.3%.

The amount of ammonia required to produce a 1:1 molar ratio of ammonia to dihydroisohumulone when measured at standard conditions for 0.3943 gram of dihydroisohumulone is: theoretical—26.8 mls. When measured at standard conditions the ammonia actually complexed in this precipitate was: 27.1 mls.

EXAMPLE 5

Isohumulone was prepared by the methods of Wollmer and Howard as above referenced. The isohumulone was hydrogenated to tetrahydroisohumulone by the method of Brown, supra.

The procedure for the formation of an ammonia complex of the tetrahydroisohumulone was followed as described in Example 1. The theoretical values expected from the elemental analysis of the ammonia complex of tetrahydroisohumalone in a 1:1 molar ratio of ammonia to tetrahydroisohumulone are as follows:

Carbon—65.8%; hydrogen—9.7%; nitrogen—3.6%.

The analysis of a precipitate produced by this procedure was:

Carbon—66.5%; hydrogen—10.0%; nitrogen—3.2%.

The amount of ammonia required to produce a 1:1 molar ratio of ammonia to tetrahydroisohumulone when measured at standard conditions for 0.3943 grams of tetrahydroisohumulone is: Theoretical—24.5 mls. When measured at standard conditions the ammonia actually complexed in the preparation of this precipitate was: 24.1 mls.

The use of the herein described ammonia complexes in beer is described in the remaining examples. The use of hop derivatives in brewing is to some degree a matter of personal judgment of the brewmaster. A typical range for kettle addition is 40–80 ppm. (as humulone, isohumulone, etc.), whereas a typical post-kettle range is 15–40. But these are only orders of magnitude and many variations and combinations are possible for kettle and post-kettle additions.

EXAMPLE 6

To show the utility of the ammonia complex of isohumulone when used in the normal brewing process, a pilot brew was made.

50 P.P.M. of isohumulone as an ammonia complex was added to the wort. The wort wsa given a 70 minute boil. After boiling, the wort was allowed to rest for 20 minutes and then cooled to 50° F. The wort was inoculated with approximately 10 million yeast cells per cc.

After 7 days of fermentation at 53 to 54° the beer was cooled to 30° F. and held in ruh storage for 2 weeks. The beer was filtered, chillproofed and transferred to an aging tank. After 7 days of aging and carbonation it was packaged and pasteurized.

The isohumulone balance for the process was as follows:

Isohumulone added to kettle _____p.p.m__ 50.0
Isohumulone found in the finished
  product _____p.p.m__ 18.1
Percent of utilization _____ 36.2

EXAMPLE 7

To show the utility of the ammonia complex of rho-isohumulone when added to the kettle, a pilot brew was prepared as described in Example 6.

50 p.p.m. of rho-isohumulone as the ammonia complex was added to the brew kettle. The final product was finished, packaged, and pasteurized.

The isohumulone balance for rho-isohumulone was as follows:

Rho-isohumulone added to kettle _____p.pm__ 50.0
Rho-isohumulone found in the finished
  product _____p.p.m__ 24.1
Percent of utilization of rho-isohumulone _____ 48.2

EXAMPLE 8

To show the utility of the ammonia complex of dihydroisohumulone (prepared as described in Example 4) a pilot brew as described in Example 6 was made.

50 p.p.m. of dihydroisohumulone as the ammonia complex was added to the brew kettle. The resulting beer was fermented, finished, packaged, and pasteurized.

The isohumulone balance for the process was as follows:

Dihydroisohumulone added to kettle _____p.p.m__ 50.0
Dihydroisohumulone found in the finished product
  _____p.p.m__ 20.5
Percent of utilization of dihydroisohumulone _____ 41.0

EXAMPLE 9

To show the utility of the ammonia complex of tetrahydroisohumulone (prepared as described in Example 6) when used in the normal brewing process, a pilot brew was made.

50 p.p.m. of the ammonia complex of tetrahydroisohumulone was added to the wort in the brew kettle. The beer was fermented, finished, packaged, and pasteurized.

The tetrahydroisohumulone balance for the process was as follows:

Tetrahydroisohumulone added to kettle ___ p.p.m__ 50.0
Tetrahydroisohumulone found in the finished product
  _____p.p.m__ 14.7
Percent of utilization of tetrahydroisohumulone __ 29.4

EXAMPLE 10

To show the utility of the ammonia complex of isohumulone when added to an unhopped beer during the source of finishing operations, a pilot brew was made. The procedure as described in Example 6 was followed with the exception that no hops or hop compounds were added to the wort during the kettle boil.

30 p.p.m. of isohumulone as the ammonia complex was added after the filtration, following the ruh storage period. Excellent utilization of isohumulone is evidenced by the following material balance:

Isohumulone added after first filtration ____p.p.m__ 30.0
Isohumulone found in the finished product _p.p.m__ 22.0
Percent of utilization _____ 73.3

Example 11

To show the utility of the ammonia complex of rho-isohumulone when added to an unhopped beer during the course of finishing operations, a pilot brew was made. The procedure as described in Example 6 was followed with the exception that no hops or hop compounds were added to the wort during the kettle boil.

30 p.p.m. of rho-isohumulone as the ammonia complex was added after the filtration, following the ruh storage period. Excellent utilization of rho-isohumulone is evidenced by the following material balance:

Rho-isohumulone added after first filtration _p.p.m__ 30.0
Rho-isohumulone found in the finished product
  _____p.p.m__ 23.8
Percent of utilization _____ 79.3

EXAMPLE 12

To show the utility of the ammonia complex of dihydroisohumulone when added to an unhopped beer during the course of finishing operations, a plot brew was made. The procedure as described in Example 6 was followered with the exception that no hops or hop compounds were added to the wort during the kettle boil.

30 p.p.m. of dihydroisohumulone as the ammonia complex was added after the filtration, following the ruh storage period. Excellent utilization of dihydroisohumulone as evidenced by the following material balance:

Dihydroisohumulone added after the first filtratration
  _____p.p.m__ 30.0
Dihydroisohumulone found in the finished product
  _____p.p.m__ 26.4
Percent of utilization _____ 88.0

EXAMPLE 13

To show the utility of the ammonia complex of tetrahydroisohumulone when added to an unhopped beer during the course of finishing operations, a pilot brew was made. The procedure as described in Example 6 was followed with the exception that no hops or hop compounds were added to the wort during the kettle boil.

30. p.p.m of tetrahydroisohumulone as the complex was added after the filtration, following the ruh storage period. Excellent utilization of tetrahydroisohumulone is evidenced by the following material balance:

Tetrahydroisohumulone added after first filtration _____p.p.m__ 30.0
Tetrahydroisohumulone found in the finished product _____p.p.m__ 22.9
Percent of utilization _____ 76.3

The beers produced in the pilot brews described in Example 6 through 13 were judged by qualified taste testers and technologists to have taste and physical properties consistent with pilot beer made with conventional hop addition techniques.

We claim:
1. A method for the production of a granular non-sticky free-flowing ammonia complex of a hop acid compound comprising reacting said compound with ammonia in solution in a substantially anhydrous solvent for said compound, said solvent having a dielectric constant not greater than 2.1, said complex being substantially insoluble in said solvent.
2. The method according to claim 1 in which said compound is selected from the group consisting of humulone, catalytically reduced humulone, and the respective iso forms thereof; and metal borohydride reduced isohumulone.
3. The method according to claim 2 in which the compound is humulone.
4. The method according to claim 2 in which the compound is isohumulone.
5. The method according to claim 2 in which the compound is metal borohydride reduced isohumulone.
6. The method according to claim 2 in which the compound is dihydroisohumulone.
7. The method according to claim 2 in which the compound is tetrahydroisohumulone.
8. The method according to claim 3, wherein the humulone is present as a component of a solvent extract of hops also containing lupulone, and the resulting ammonia: humulone complex is subsequently separated from the solvent solution, thereby preferentially separating humulone from lupulone.
9. Granular non-sticky free-flowing complex of ammonia with a hop acid compound, said complex having an ammonia: hop acid compound mole ratio of 1:1.
10. The complex according to claim 9 in which the compound is humulone.
11. The complex according to claim 9 in which the compound is isohumulone.
12. The complex according to claim 9 in which the compound is metal borohydride reduced isohumulone.
13. The complex according to claim 9 in which the compound is dihydroisohumulone.
14. The complex according to claim 9 in which the compound is tetrahydroisohumulone.

References Cited

UNITED STATES PATENTS 3,143,425  8/1964  Mueller _____ 99—50.5

OTHER REFERENCES

Hudson et al., J. Institute of Brewing, vol. 65, pp. 414–18, 1962.

A. LOUIS MONACELL, Primary Examiner

G. M. NATH, Assistant Examiner